United States Patent
Chang

(10) Patent No.: US 7,436,392 B2
(45) Date of Patent: Oct. 14, 2008

(54) METHOD OF DYNAMICALLY UPDATING A MOUSE ASSEMBLY KEY CODE TABLE

(76) Inventor: Yuan-Jung Chang, 4F, No. 228, Min An Rd., Hsinchuang City, Taipei Hsien (TW)

( * ) Notice: Subject to any disclaimer, the term of this patent is extended or adjusted under 35 U.S.C. 154(b) by 731 days.

(21) Appl. No.: 11/135,502

(22) Filed: May 24, 2005

(65) Prior Publication Data

US 2006/0267938 A1 Nov. 30, 2006

(51) Int. Cl.
*G09G 5/08* (2006.01)
(52) U.S. Cl. ...................................... 345/163; 345/156
(58) Field of Classification Search ......... 345/156–167; 455/419; 710/8
See application file for complete search history.

(56) References Cited

U.S. PATENT DOCUMENTS

| 5,455,945 | A | * | 10/1995 | VanderDrift | .................... 707/2 |
| 6,098,184 | A | * | 8/2000 | Patterson, Jr. | ................ 714/44 |
| 2003/0078036 | A1 | * | 4/2003 | Chang et al. | ................. 455/419 |
| 2005/0102441 | A1 | * | 5/2005 | Yeh et al. | ......................... 710/8 |
| 2005/0154900 | A1 | * | 7/2005 | Muttik | ........................ 713/188 |

* cited by examiner

*Primary Examiner*—Nitin Patel
(74) *Attorney, Agent, or Firm*—Rosenberg, Klein & Lee

(57) ABSTRACT

The invention describes a method of dynamically updating a mouse assembly key code table to overcome the shortcomings of a prior art fixed mouse press button definition by installing a mouse and storing a plurality of mouse assembly key code tables in the memory, so that users can use an application program mode to update the mouse assembly key code table and define the press buttons of a mouse universally used for different computers.

20 Claims, 3 Drawing Sheets

METHOD OF DYNAMICALLY UPDATING A MOUSE ASSEMBLY KEY CODE TABLE

BACKGROUND OF THE INVENTION

1. Field of the Invention

The present invention relates to a method of updating a mouse assembly key code table, and more particularly to a method of dynamically updating a mouse assembly key code table.

2. Description of Related Art

As technologies advance, computer peripherals are introduced constantly to the market. For example, computer input devices such as keyboards or mice are-changed from the original cabled devices to wireless devices.

In a prior art mouse design, the- information of a mouse button is usually fixed and determined by an operating system, or the mouse button is defined by users through a mouse window provided by the operating system. However, the definition of the mouse button is stored in a computer and not in the mouse. The operating system uses a driver program to drive the mouse according to the user-defined mouse button. If a user uses the mouse for another computer, the user has to redefine the mouse button through the mouse window provided by the operating system, which causes tremendous inconvenience to the user.

SUMMARY OF THE INVENTION

Therefore, it is a primary objective of the present invention to overcome the foregoing shortcomings of the prior art by providing a method of dynamically updating a mouse assembly key code table, so that users can dynamically update the definition of a mouse assembly key code table in a memory of the mouse.

To achieve the foregoing objective, the present invention provides a method of updating a mouse assembly key code table. The mouse is electrically connected to a client, and the method comprises the steps of executing an application program in the client; detecting whether or not the client is connected to a remote server; comparing a database version at the client with a database version at the remote server; inquiring whether or not to update the database version at the client; downloading the database in the remote server to the client and overwriting the original database; detecting whether or not a mouse assembly key code table contained in the mouse maps with the same mouse assembly key code table in the overwritten -database at the client; inquiring whether or not it is necessary to, update the content of the mouse assembly key code table contained in the mouse; giving an instruction by the application program to the mouse to enter into a download mode; and updating the content of the mouse assembly key code table contained in the mouse and starting the use of the updated mouse assembly key code table.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

To make it easier for our examiner to understand the objective of the invention, its structure, innovative features, and performance, we use a preferred embodiment together with the attached drawings for the detailed description of the invention. However, the drawings are provided for examples only and not intended to limit the present invention.

To overcome the foregoing shortcomings of the prior arts, the present invention installs an electrically erasable programmable read-only memory (EEPROM) in a mouse and makes use of a method of dynamically updating a mouse assembly key code table. The method includes three ways.

Figure 1:
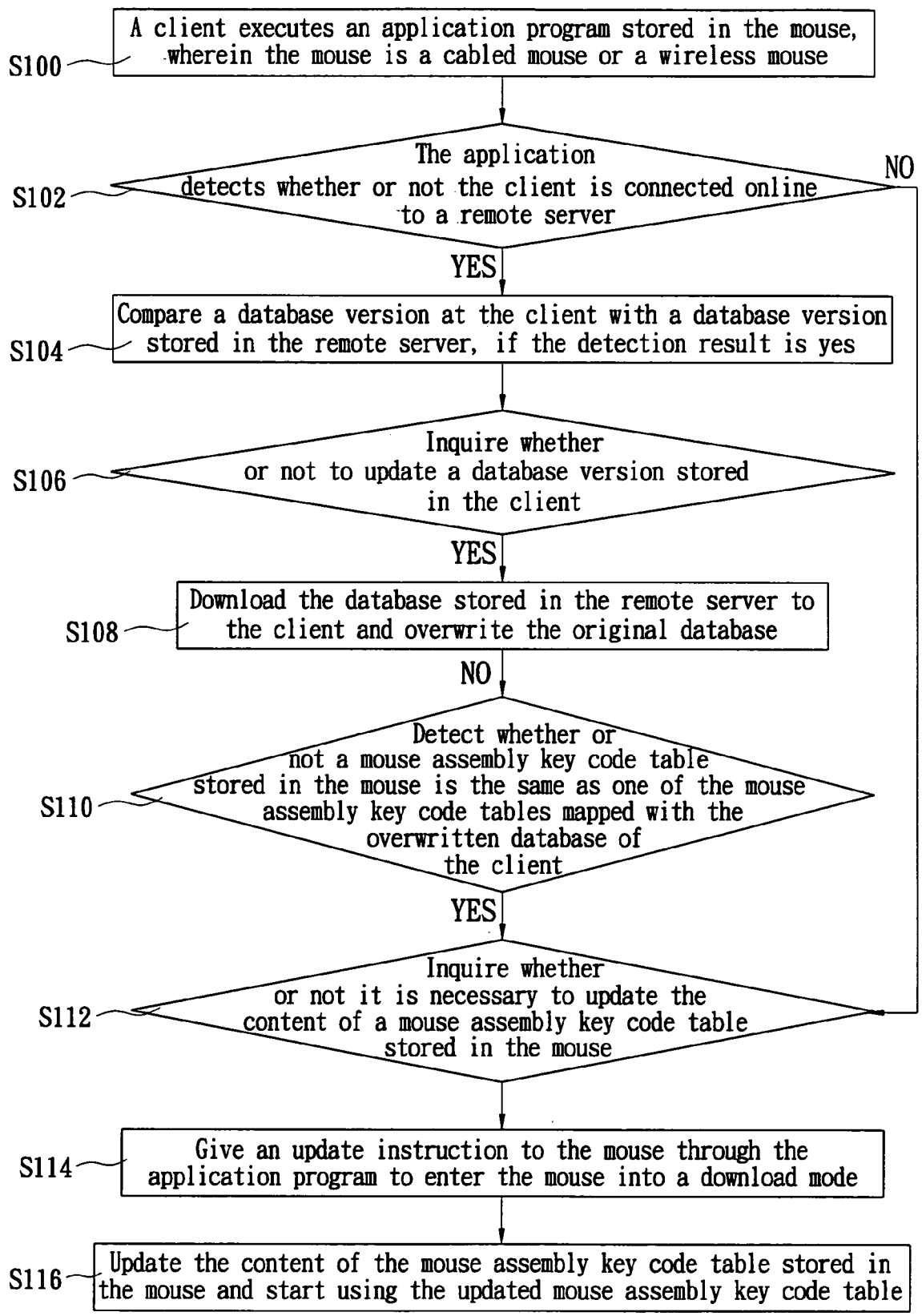
FIG. 1 is a flow chart of dynamically updating a mouse assembly key code table according to a first preferred embodiment of the present invention.

Reference is made to FIG. 1 for the first way. FIG. 1 shows a flow chart of a method of dynamically updating a mouse assembly key code table according to a first preferred embodiment of the present invention. The mouse is electrically coupled to a client, and the method comprises the following steps:

(S100) A client executes an application program stored in the mouse, with the mouse being a cabled mouse or a wireless mouse.

(S102) The application detects whether or not the client is connected to a remote server, where the online connection is achieved through a network.

(S104) In the step of detecting the client, if the detection result is yes, a database version at the client is compared with a database version stored in the remote server.

(S112) If the detection result is no, the process inquires whether or not it is necessary to update the content of a mouse assembly key code table stored in the mouse. The databases of the client and the remote server store a plurality of mouse assembly key code tables;

(S106) The process inquires whether or not to update a database version stored in the client.

(S108) In the step of inquiring whether or not to update a database version stored in the client, if the answer is yes, the database stored in the remote server is downloaded to the client and the original database overwritten thereby;

(S110) Whether or not a mouse assembly key code table stored in the mouse is the same as that of the mouse assembly key code tables mapped with the overwritten database of the client is detected.

(S112) In the step of detecting a mouse assembly key code table stored in the mouse, if the detection result is no, the process inquires whether or not it is necessary to update the content of a mouse assembly key code table stored in the mouse;

(S114) An update instruction is given to the mouse through the application program to enter the mouse into a download mode.

(S116) The contents of the mouse assembly key code table stored in the mouse are updated and the use of the updated mouse assembly key code table is started. The contents of the mouse assembly key code table in the mouse are stored in a memory, and the memory is an EEPROM or a flash memory.

Figure 2:
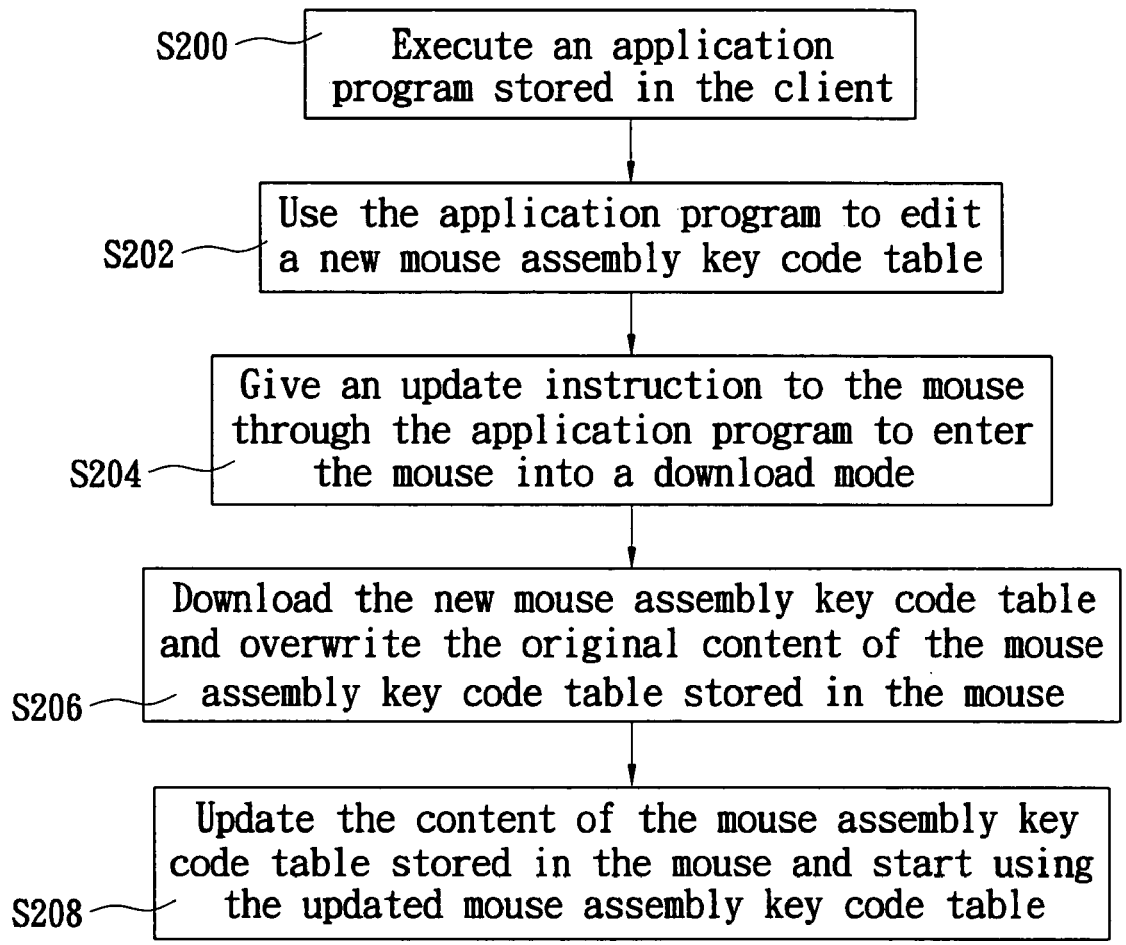
FIG. 2 is a flow chart of dynamically updating a mouse assembly key code table according to a second preferred embodiment of the present invention.

Reference is made to FIG. 2 for the second way. FIG. 2 shows the flow chart of a method of dynamically updating a mouse assembly key code table in accordance with a second preferred embodiment of the present invention. The mouse is electrically coupled to a client, and the method comprises the following steps.

(S200) An application program stored in the client is executed.

(S202) The application program is used to edit a new mouse assembly key code table.

(S204) An updated instruction is given to the mouse through the application program to enter the mouse into a download mode. The mouse is a cabled mouse or a wireless mouse.

(S206) The new mouse assembly key code table is downloaded and the original content of the mouse assembly key code table stored in the mouse is overwritten thereby. The contents of the mouse assembly key code table in the mouse are stored in a memory, and the memory is an EEPROM or a flash memory.

(S208) The contents of the mouse assembly key code table stored in the mouse are updated and the use of the updated mouse assembly key code table is started.

Figure 3:
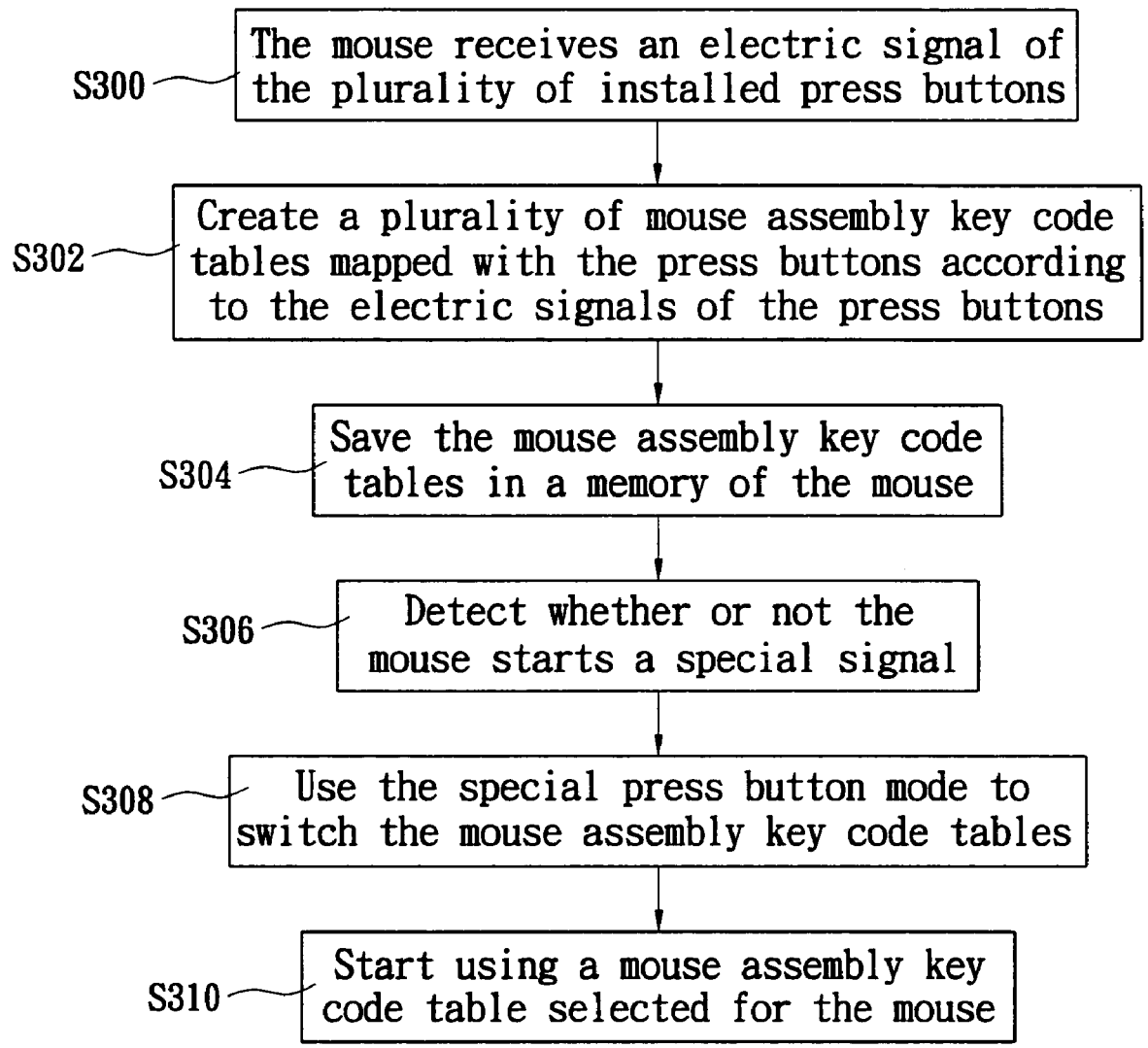
FIG. 3 is a flow chart of dynamically updating a mouse assembly key code table according to a third preferred embodiment of the present invention.

Reference is made to FIG. 3 for the third way. FIG. 3 shows a flow chart of a mouse assembly key code table in accordance with a third preferred embodiment of the present invention. The mouse is electrically coupled to a client and the method comprises the following steps.

(S300) The mouse receives an electric signal of a plurality of installed press buttons. The mouse is a cabled mouse or a wireless mouse.

(S302) A plurality of mouse assembly key code tables are created. The mouse assembly key code tables are mapped with the press buttons according to the electric signals of the press buttons.

(S304) The mouse assembly key code tables are saved in a memory of the mouse. The memory stores a plurality of mouse key code tables, and the memory can be an electrically erasable programmable read-only memory (EEPROM) or a flash memory.

(S306) Whether or not the mouse starts a special signal is detected. The special signal is produced by a special press button and the special press button can be a switch. If the detection result is yes, then the special press button mode is used to switch the mouse assembly key code tables.

(S308) The special press button mode is used to switch the mouse assembly key code tables.

(S310) Use of a mouse assembly key code table selected for the mouse begins.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of dynamically updating a mouse assembly key code table, said mouse being electrically coupled to a client, and said method comprising the steps of:
   executing an application program stored in said client;
   detecting whether or not said client is connected online with a remote server;
   inquiring whether or not to update a database version in said client;
   downloading a database stored in said remote server to said client and overwriting an original database;
   detecting whether or not a mouse assembly key code table contained in said mouse maps with one of identical mouse assembly key code tables in said overwritten database of said client;
   inquiring whether or not to update contents of a mouse assembly key code table contained in said mouse; and
   updating the contents of said mouse assembly key code table contained in said mouse and starting use of said updated mouse assembly key code table.

2. The method of dynamically updating a mouse assembly key code table of claim 1, wherein said mouse is a cabled mouse or a wireless mouse.

3. The method of dynamically updating a mouse assembly key code table of claim 1, wherein said online connection is achieved by a network.

4. The method of dynamically updating a mouse assembly key code table of claim 1, wherein said step of detecting said client further comprises a step of comparing a database version contained in said client with a database version contained in said remote server.

5. The method of dynamically updating a mouse assembly key code table of claim 4, wherein if a detection result is yes, said step of detecting said client compares a database version contained in said client with a database version contained in said remote server, and if the detection result is no, whether or not contents of a mouse assembly key code table contained in said mouse needs to be updated is inquired.

6. The method of dynamically updating a mouse assembly key code table of claim 5, wherein said databases contained in said client and said remote server store a plurality of mouse assembly key code tables.

7. The method of dynamically updating a mouse assembly key code table of claim 1, wherein in said step of inquiring whether or not a database version needs to be updated, if an answer is yes, a database contained in said remote server is downloaded to said client and an original database is overwritten thereby.

8. The method of dynamically updating a mouse assembly key code table of claim 1, wherein if a detection result is no, said step of detecting a mouse assembly key code table contained in said mouse inquires whether or not the contents of a mouse assembly key code table contained in said mouse need to be updated.

9. The method of dynamically updating a mouse assembly key code table of claim 1, wherein said content of said mouse assembly key code table is stored in a memory.

10. The method of dynamically updating a mouse assembly key code table of claim 9, wherein said memory is an electrically erasable programmable read-only memory or a flash memory.

11. The method of dynamically updating a mouse assembly key code table of claim 1, wherein said step of inquiring whether or not contents of a mouse assembly key code table contained in said mouse need to be updated gives an update instruction to said mouse to enter into a download mode through said application program.

12. A method of dynamically updating a mouse assembly key code table, said mouse being electrically coupled to a client, and said method comprising the steps of:
   executing an application program stored in said client;
   using said application program to edit a new mouse assembly key code table;
   giving an update instruction to said mouse to enter into a download mode through said application program;
   downloading said new mouse assembly key code table to overwrite an original database contained in said mouse; and updating contents of said mouse assembly key code table contained in said mouse and starting use of said updated mouse assembly key code table.

13. The method of dynamically updating a mouse assembly key code table of claim 12, wherein said mouse is a cabled mouse or a wireless mouse.

14. The method of dynamically updating a mouse assembly key code table of claim 12, wherein said contents of said mouse assembly key code table contained in said mouse are stored in a memory.

15. The method of dynamically updating a mouse assembly key code table of claim 12, wherein said memory is an electrically erasable programmable read-only memory or a flash memory.

16. A method of dynamically updating a mouse assembly key code table, said mouse being electrically coupled to a client, and said method comprising the steps of:
  receiving a plurality of electric signals of press buttons installed in said mouse;
  creating a plurality of mouse assembly key code tables mapped with said press buttons according to said electric signals of said press buttons;
  storing said mouse assembly key code table in a memory of said mouse;
  detecting whether or not said mouse enables a special signal, wherein said special signal is produced by a special press button;
  using said special key mode to switch said mouse assembly key code tables; and
  starting use of a mouse assembly key code table selected for said mouse.

17. The method of dynamically updating a mouse assembly key code table of claim 16, wherein said mouse is a cable mouse or a wireless mouse.

18. The method of dynamically updating a mouse assembly key code table of claim 16, wherein a plurality of mouse assembly key code tables is stored in said memory.

19. The method of dynamically updating a mouse assembly key code table of claim 16, wherein said memory is an electrically erasable programmable read-only memory or a flash memory.

20. The method of dynamically updating a mouse assembly key code table of claim 16, wherein said step of detecting whether or not said mouse enables a special signal uses said special press button mode to switch said mouse assembly key code tables, if a detection result is yes.

\* \* \* \* \*